Patented Feb. 13, 1951

2,541,896

UNITED STATES PATENT OFFICE 2,541,896

MOLDING COMPOSITIONS AND ARTICLES MADE THEREFROM

Natcho Vasileff, Loch Arbour, and Anthony L. Alesi, Princeton, N. J., assignors to Research Corporation, New York, N. Y., a corporation of New York No Drawing. Application November 9, 1948, Serial No. 59,198

15 Claims. (Cl. 154—43)

This invention relates to new molding compositions and articles made therefrom and particularly to new aldehyde type resinous compositions suitable for the production of glass fiber molding compositions and molded articles.

The term "aldehyde type condensation resin" is used to denote resins prepared with an aldehyde, such as formaldehyde, and another reactive substance, such as phenol, urea, aniline and melamine, which combine to form initially a methylol compound. The methylol group, represented by —CH$_2$OH, is a reactive group which links the monomer units to form resinous materials. Water and some formaldehyde (or other aldehyde) are eliminated on curing. However, in the cured material, some methylol groups remain. These residual groups adversely affect the electrical properties of the cured resin, particularly on exposure to moisture.

This adverse effect is particularly undesirable when the resins are used in glass fiber molded structures, such as glass cloth laminates, as it prevents attaining the high stability of electrical properties particularly desired in such glass fiber molded structures.

It is the principal object of the invention to provide resin composition having improved electrical properties.

Another object of the invention is the provision of glass fiber molding compositions and molded articles, such as glass fiber laminates, which have improved electrical properties and particularly improved stability of electrical properties under exposure to moisture.

It has been found that by adding to aldehyde type condensation resins an organosilane compound containing at least one hydroxyl group attached to the silicon, or a group readily convertible thereto by hydrolysis such as, halogen, amino and ester groups, the stability of the electrical properties of molded articles made therefrom is greatly improved. It is believed that this is effected by the elimination of the methylol groups by reaction of the silane compound therewith during the curing operation.

Suitable organo-silane compounds for use in the invention are, for example, di-tertiarybutoxydiaminosilane, di-tertiarybutoxysilanediol, diphenylsilanediol, and tetraethyl orthosilicate.

The organo-silane additive may be incorporated into the resin at any convenient stage during the resin formation or thereafter. The resin additive may be incorporated into the resin by the use of a mutual solvent or it may merely be mixed and suspended in the resin. Only small amounts are required for effective results; the optimum range is from 0.5 to 5% by weight. An excess of the resin additive is to be avoided as an excess will tend to increase the dielectric loss factor. This improved resin may be blended with various fillers such as wood flour, mica, glass fibers, glass cloth, and the like.

Structures of particularly good electrical properties are obtained when the improved aldehyde type resins of the invention are combined with fillers, such as, glass fibers, glass cloth, mica, or asbestos treated with alkoxysilanols as described in our application Serial No. 58,366 filed November 4, 1948.

For example, 1.42% by weight of di-tertiarybutoxydiaminosilane dissolved in n-butanol containing sufficient water to hydrolyse the amino groups to hydroxy groups is added to melamine-formaldehyde condensation product (1-melamine-2 formaldehyde). The resulting molding resin when indurated by heat and pressure under standard conditions gives a molded product having substantially lower dielectric constant power factor and loss factor at both high and low frequencies than the product from the unmodified melamine-formaldehyde condensation product.

In the preparation of glass cloth laminates in accordance with the principles of the invention, the following procedure is effective.

An impregnating resin solution is prepared by dissolving 95 parts by weight of a melamine-formaldehyde condensation product (1 melamine-2 formaldehyde) in 95 parts of water at about 70° C. and adding 5 parts of di-tertiarybutoxydiaminosilane in 5 parts of n-butanol with vigorous stirring. Thoroughly pyrolized glass cloth is then coated with the resin solution to give a coating of 45 to 50% of dry resin on the cloth. The coated cloth is built up into a laminated structure which is molded at 300° F. and 1,000 p. s. i. for 15 minutes for a laminate of ⅛ inch thickness.

The following is an example of the preparation of a phenol-formaldehyde resin molding compound:

Two grams of di-tertiarybutoxydiaminosilane is dissolved and hydrolysed to the diol in 18 ml. of 95% ethanol. This solution is added to 50 grams of a phenol-formaldehyde resin solution containing 65% of solids. The mixture is dehydrated under vacuum in an oil bath at 120–130° C., and heat treated by heating for three five minute periods in an oven at 130° C. each followed by 5 minutes under vacuum.

Molded products of this material show a substantially lower loss factor at low and high frequencies than the products from the unmodified resins.

Resinous molding compositions made in accordance with the invention also show an improved flow during the molding operation and a decreased brittleness of the molded products.

We claim:

1. A molding composition comprising an aldehyde type condensation resin of the group consisting of phenol-aldehyde resins, urea-aldehyde resins, aniline-aldehyde resins and melamine-aldehyde resins and from about 0.5 to about 5% by weight of a tertiarybutoxysilanol based on the resin.

2. A molding composition comprising an aldehyde type condensation resin of the group consisting of phenol-aldehyde resins, urea-aldehyde resins, aniline-aldehyde resins and melamine-aldehyde resins and from about 0.5 to about 5% by weight of di-tertiarybutoxysilanediol based on the resin.

3. A molding composition comprising a melamine-formaldehyde resin and from about 0.5 to about 5% by weight of di-tertiarybutoxysilanediol based on the resin.

4. A molding composition comprising an aldehyde type condensation resin of the group consisting of phenol-aldehyde resins, urea-aldehyde resins, aniline-aldehyde resins and melamine-aldehyde resins, from about 0.5 to about 5% by weight of a tertiarybutoxysilanol based on the resin and a filler.

5. A molding composition comprising an aldehyde type condensation resin of the group consisting of phenol-aldehyde resins, urea-aldehyde resins, aniline-aldehyde resins and melamine-aldehyde resins, from about 0.5 to about 5% by weight of di-tertiarybutoxysilanediol based on the resin and a filler.

6. A molding composition comprising a melamine-formaldehyde resin, from about 0.5 to about 5% by weight of di-tertiarybutoxysilanediol based on the resin and a filler.

7. A molding composition comprising an aldehyde type condensation resin of the group consisting of phenol-aldehyde resins, urea-aldehyde resins, aniline-aldehyde resins and melamine-aldehyde resins, from about 0.5 to about 5% by weight of a tertiarybutoxysilanol based on the resin and a glass fiber filler.

8. A molding composition comprising an aldehyde type condensation resin of the group consisting of phenol-aldehyde resins, urea-aldehyde resins, aniline-aldehyde resins and melamine-aldehyde resins, from about 0.5 to about 5% by weight of di-tertiarybutoxysilanediol based on the resin and a glass fiber filler.

9. A molding composition comprising a melamine-formaldehyde resin, from about 0.5 to about 5% by weight of di-tertiarybutoxysilanediol based on the resin and a glass fiber filler.

10. A molded article comprising an indurated aldehyde type condensation resin of the group consisting of phenol-aldehyde resins, urea-aldehyde resins, aniline-aldehyde resins and melamine aldehyde resins including from about 0.5 to about 5% by weight of a tertiarybutoxysilanol based on the resin and a filler.

11. A molded article comprising an indurated aldehyde type condensation resin of the group consisting of phenol-aldehyde resins, urea-aldehyde resins, aniline-aldehyde resins and melamine-aldehyde resins including from about 0.5 to about 5% by weight of di-tertiarybutoxysilanediol based on the resin and a filler.

12. A molded article comprising an indurated melamine-formaldehyde resin including from about 0.5 to about 5% by weight of di-tertiarybutoxysilanediol based on the resin and a filler.

13. A laminated article comprising a plurality of layers of glass cloth bonded together by an indurated aldehyde type condensation resin of the group consisting of phenol-aldehyde resins, urea-aldehyde resins, aniline-aldehyde resins and melamine-aldehyde resins including from about 0.5 to about 5% by weight of a tertiarybutoxysilanol based on the resin.

14. A laminated article comprising a plurality of layers of glass cloth bonded together by an indurated aldehyde type condensation resin of the group consisting of phenol-aldehyde resins, urea-aldehyde resins, aniline-aldehyde resins and melamine-aldehyde resins including from about 0.5 to about 5% by weight of di-tertiarybutoxysilanediol based on the resin.

15. A laminated article comprising a plurality of layers of glass cloth bonded together by an indurated melamine-formaldehyde resin including from about 0.5 to about 5% by weight of di-tertiarybutoxysilanediol based on the resin.

NATCHO VASILEFF.
ANTHONY L. ALESI.

REFERENCES CITED

The following references are of record in the file of this patent:

UNITED STATES PATENTS

| Number | Name | Date |
|---|---|---|
| 2,176,837 | Ellis | Oct. 17, 1939 |
| 2,224,815 | Glycofrides | Dec. 10, 1940 |
| 2,258,220 | Rochow | Oct. 7, 1941 |
| 2,313,678 | Simons | Mar. 9, 1943 |
| 2,389,491 | Dunlap et al. | Nov. 20, 1945 |
| 2,435,147 | McGregor et al. | Jan. 27, 1948 |